May 11, 1937.   P. R. WHEELER   2,080,294
CONTROL SYSTEM FOR TRANSMISSIONS
Filed Feb. 12, 1932   4 Sheets-Sheet 3
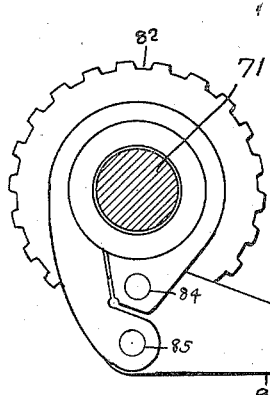
Fig. IX.
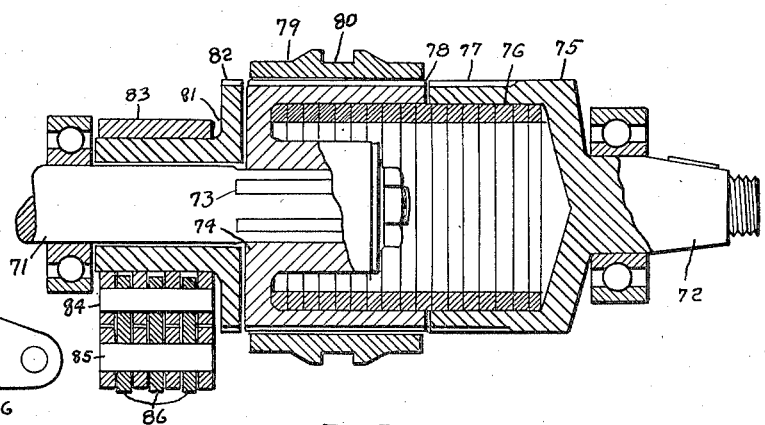
Fig. X.
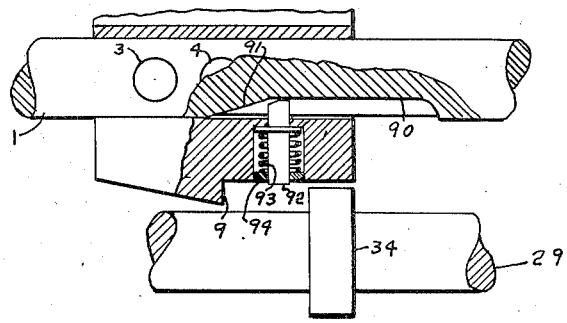
Fig. XI.
Lock Out Control
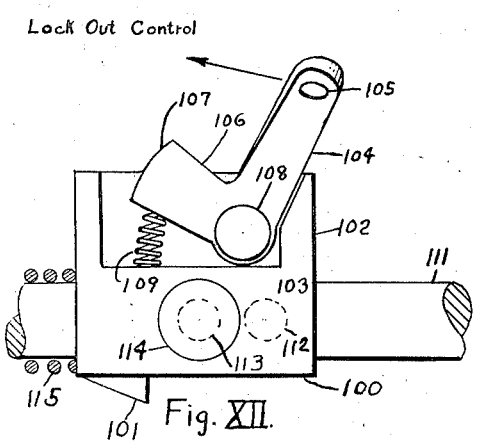
Fig. XII.
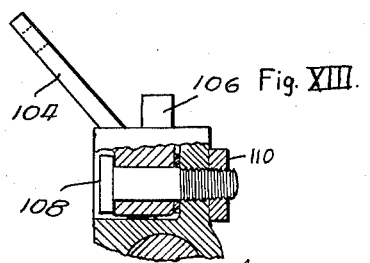
Fig. XIII.
Phillip R. Wheeler
INVENTOR

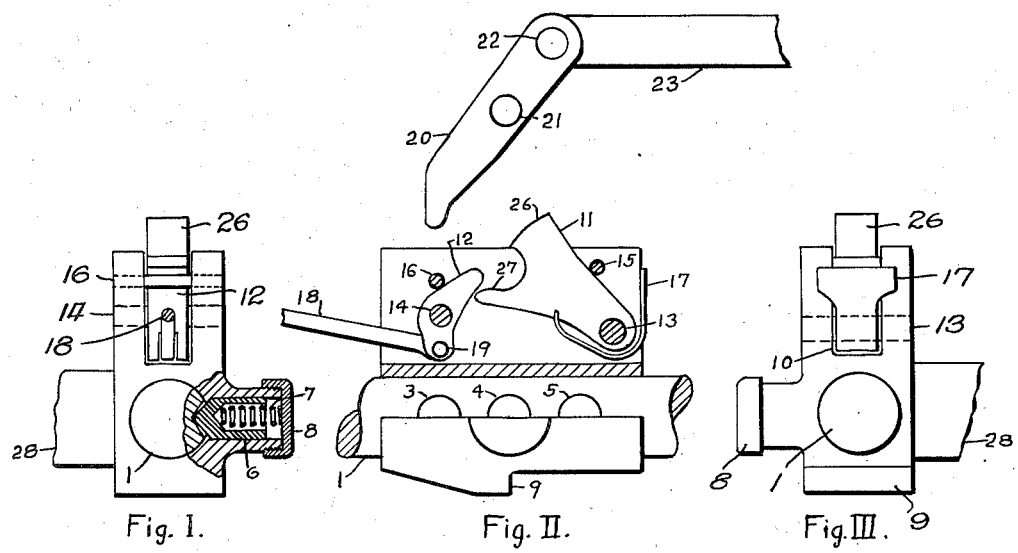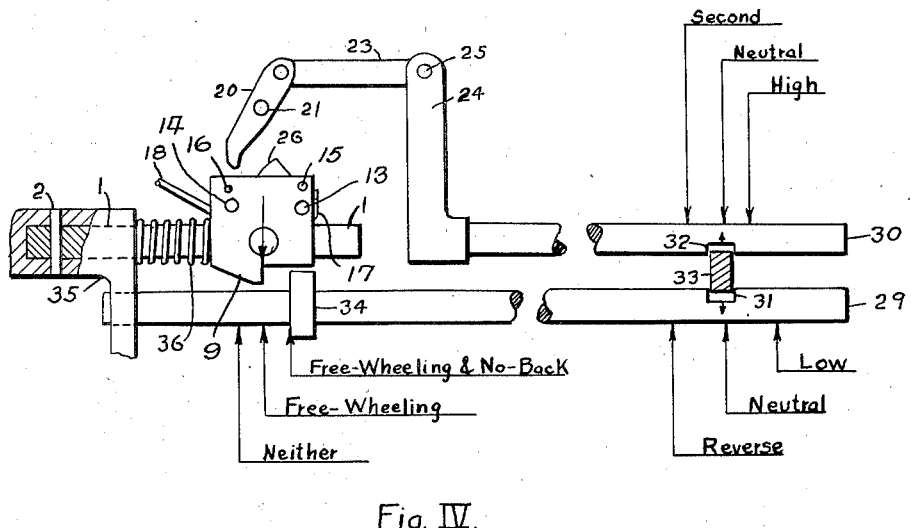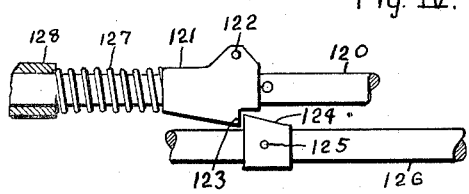

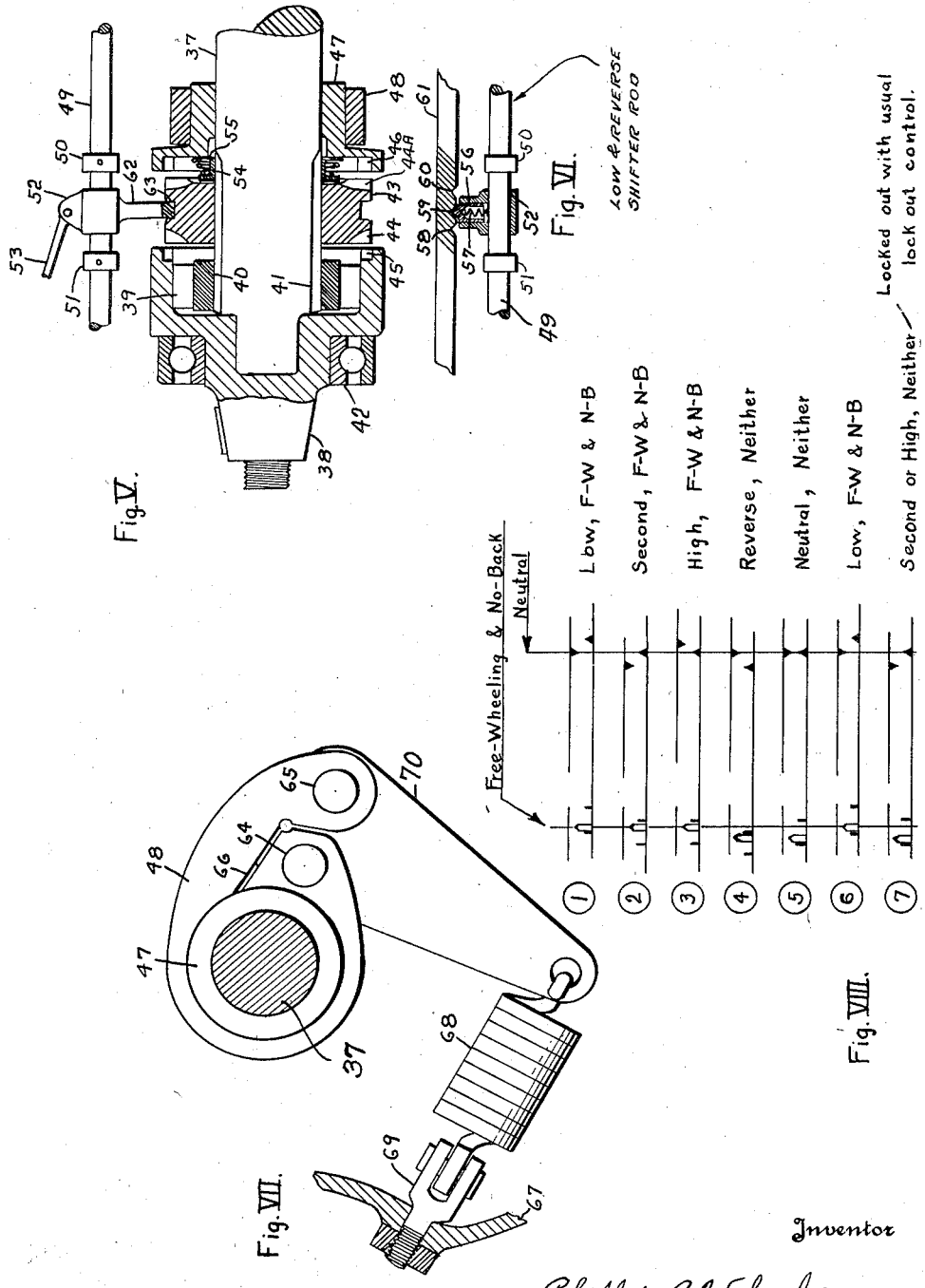

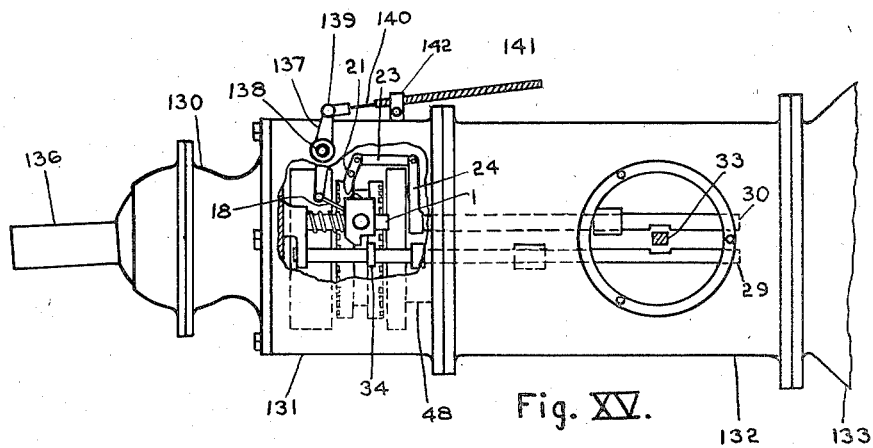
Fig. XV.
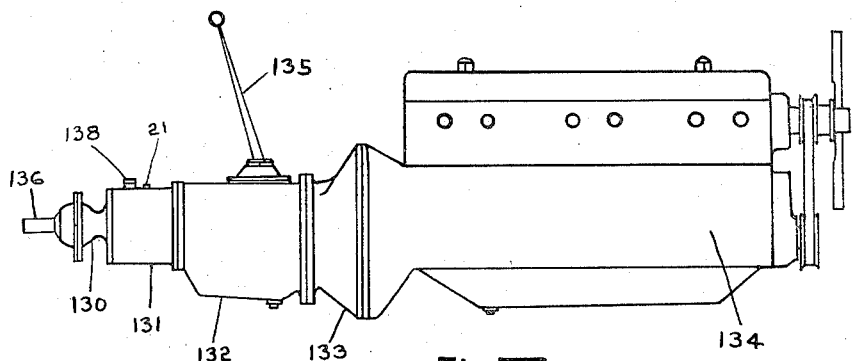
Fig. XVI.
Inventor
Phillip R. Wheeler

Patented May 11, 1937

2,080,294

UNITED STATES PATENT OFFICE 2,080,294

CONTROL SYSTEM FOR TRANSMISSIONS

Phillip R. Wheeler, Alexandria, Va.

Application February 12, 1932, Serial No. 592,634

21 Claims. (Cl. 192—4)

It will be understood that this invention is susceptible of many modifications, and, accordingly, I do not wish to be limited in protection, except as set forth in the accompanying claims.

The object of this invention is to combine a no-back unit and control with the transmissions and free-wheeling units now in use.

The purpose of the no-back unit is to hold the car from moving backwards down a hill or grade while waiting in traffic or for traffic signals. It removes the necessity of holding the brake pedal while waiting. It also removes the necessity of quickly getting the foot from the brake pedal to the accelerator and catching the car with the clutch before it starts moving backwards down hill.

A further object of the invention is to combine the control of the no-back unit with those manual controls already used and without adding any additional controls which must be handled and kept in mind. That is, the regular gear shifting lever and the free-wheeling lock out control is used as at present, the no-back unit being connected to and automatically controlled by them.

A further object of this invention is to make the free-wheeling unit and the no-back unit operative under certain conditions as needed and inoperative under other conditions. For instance, with one system of control shown, both of the units are effective in all forward speeds. When going into reverse, say to move into a parking place, the no-back and free-wheeling both become automatically locked out, the car then being the same as one equipped with neither unit.

It may seem desirable on some cars to use a different system of control in which the no-back and free-wheeling lock-out are controlled with the low and reverse shifter rod, either with or without a separate manual control, but without the use of the second and high gear shifter rod. This gives a slightly different sequence of operation.

The free-wheeling and no-back units lock out when going from neutral to reverse, and lock into use when going from neutral into low. A separate lock-out control may be effective in second and high gears and, by using the sliding member of the other system, could also be made effective in low gear.

In still another system, the free-wheeling becomes effective when coming from reverse back to neutral, while the no-back is not effective until after going into low.

Referring to the drawings:

Figure I shows a partial left-end view of a sliding control member and stationary rod, a portion of the view being shown in section.

Figure II shows a plan view of the same sliding member and stationary rod, part of the topside being cut away.

Figure III shows a partial right-end view of the same two members.

Figure IV is a plan view showing the above two members in their relation to the two shifter rods of a gear transmission.

Figure V shows a side sectional view of a combined roller-clutch type of free-wheeling unit and a clamp-ring type of no-back unit, with a control similar to that shown in Figure VIII.

Figure VI shows a partial view of the control rod and slider of Figure V, showing how the slider is positioned with stationary detents.

Figure VII shows an end view of a clamp-ring type of no-back unit.

Figure VIII shows diagrammatically for one system the relative positions of the shifter rods of a gear transmission and the sliding control member for the free-wheeling and no-back units.

Figure IX show an end view of the clamp-ring type of no-back unit used in Figure X.

Figure X shows a side-sectional view of a clamp-ring type of no-back unit and a spring-type of free-wheeling unit.

Figure XI shows a partial view of the slider and stationary rod shown in Figures I to IV, a method being shown by which the free-wheeling unit is brought back into use when the low and reverse rod is moved from the reverse position to the neutral position.

Figure XII is a plan view of a control slider similar in function to that of Figures I to IV.

Figure XIII is a partial end view of Figure XII, shown in section.

Fig. XIV shows a partial view of the shifter rods and a control slider which is designed to have the no-back or no-back and free-wheeling effective at all times except when the transmission is in reverse.

Fig. XV shows an external partially cut away plan view of an assembly of the transmission control mechanism with a conventional transmission and the free-wheeling and no-back units.

Fig. XVI shows an external side elevation of a power plant and transmission assembly with the no-back or no-back and free-wheeling units.

The free-wheeling and no-back units shown in Figures V and VII or in IX and X may be controlled by the system shown in Figures I to IV or by any of the modifications shown in Figures V and VI, in XI, in VII and XIII or in XIV.

Referring to Figures I, II, III and IV, at 1 is shown a stationary rod, it being secured to a part of a transmission or other housing with the pin 2. Detent holes are shown at 3, 4, and 5, these being engaged by the sliding member 6. The spring 7 is held in place by the cap 8 and exerts a push upon the detent member.

The control slider shown in Figures I, II and III has a shoulder 9, for engaging a collar on the low and reverse shifter rod 29. A recess or slot is shown at 10, this housing the pivoted dog 11 and pivoted lever 12. The two pins about which the pivoted members turn are shown at 13 and 14, respectively. Two pin stops for the members are shown at 15 and 16. The spring 17 normally keeps the dog 11 in the position shown.

The usual manual lock-out control for the free-wheeling unit is by means of the rod or wire 18 and pin 19 connected to the lever 12.

A lever 20 having a stationary pivot 21 is connected by a pin 22 to the link 23. The link 23 is connected to the arm 24 with the pin 25.

The dog 11 has a face 26 which is a circle arc about the pin 13. The arm of the dog shown at 27 is engaged with the lever 12 as shown in Figure II.

The projection 28 shown in Figures I and III, carries the fork or other connection to the sliding control member for the free-wheeling and no-back units. This member may be seen centrally positioned in Figures V and X.

Referring to Figure IV, a low and reverse shifter rod for a gear transmission is shown at 29. A second and high shifter rod is shown at 30. The end of the gear-shift lever which engages the slots 31 and 32 is shown at 33. The arrow and the markings indicate the relative positions of the different shifts.

The low and reverse rod 29 has the collar 34 fixed upon it in the position shown. This rod is supported in and slides through a portion of the housing 35. The spring 36 may be used, if desired, to move or help move the slider in one direction. It may be desirable to use the spring if the manual control connection 18 is of the push-pull type commonly used. These controls are capable of exerting much more force in the pull direction than in the push, so a spring as at 36 might be desirable to assist in the push direction.

The position of the control slider shown in Fig. IV is that of free-wheeling only with the no-back locked out. This would be desirable if it were necessary to push a car backward by hand or other means. This position can be obtained by use of the manual control 18 or by a partial shift to reverse, that is, a shift only part way until the control slider registers on detent hole 4. After having been in reverse this position might be effected by a partial shift to second if the manual control 18 is in the free-wheeling and no-back position.

When considering the operation of the system shown in Figure IV, it must be remembered that the sliding member shown in Figures I to III has a fork, which is part of the projection 28, this fork engaging a sliding clutch member on the drive shaft, such as that shown in Figure V and Figure X.

In Figure IV, the broken out sections of the two shifter rods shown carry the forks or yokes for engaging gears and clutches of the transmission proper. In the plan view shown, all gears are in neutral and the free-wheeling and no-back control member is also in a neutral position, that is, it is engaged with neither. This position gives free-wheeling without the no-back. The slider, of Figures I to III, is positioned by the middle detent 4.

It will be noted that when the rod 29 moves forward to the position of low, it does not engage the control slider. When, however, the rod 29 is moved to reverse position, the collar 34 engages the shoulder 9, carrying to the position marked "Neither". In this position neither the free-wheeling nor the no-back is effective. When the rod 29 is moved to low again, the control slider stays at the position "Neither."

Thus, after once shifting into reverse, the car may be shifted from reverse to low or vice versa without having either free-wheeling or no-back. When, however, a shift to second gear is made, the shifter rod 30 swings the lever 20 about the stationary pivot 21. The lever end makes contact on the face 26 of the dog or catch 11, thus carrying the control slider to the position marked "Free-wheeling and no-back." It will now be noted that the shoulder 9 is even with the collar 34, the rod 29 being in a neutral position.

When the rod 30 is moved to high, the lever 20 is swung back about the stationary pivot 21, the end swinging away from the face 26 of the catch 11. The control slider retains its position, giving free-wheeling and no-back.

It will now be observed that the shifter rod 30 may be moved to either high or second without affecting the position of the control slider. Also the shifter rod 29 may be moved from its neutral position to low and back to neutral again without affecting the position of the control slider. Thus after shifting into second, free-wheeling and no-back are effective in all forward speeds and in neutral.

When, however, the shifter rod 29 is moved to the reverse position, the free-wheeling and no-back are both locked out until after shifting back into second again.

The above control is with the regular shifting lever only. With the use of the manual free-wheeling lock-out control, which operates by means of the wire or rod 18 and lever 12, the free-wheeling and no-back may be locked out at any or all times. When a pull is exerted upon 18, the lever 12 engages the arm 27 swinging the dog 11 about the pivot 13. The face 26 slides by the end of the lever 20 until it is flush with the side of the control slider. The control slider then moves to the left under the pull of the rod or wire 18 and is held there until released.

A spring 36 may be used if desired to help return the control slider to the right when it is desired to have free-wheeling and no-back. The wire, or rod 18 may be attached to any of the conventional free-wheeling lock-out controls, such as a lever or a wire to the dash.

Referring to Figure V, which is a modification the end of a transmission shaft is shown at 37 and the end of a drive shaft or connection for one at 38. The unit may either be placed with a transmission inside of a single housing or it may be mounted in a separate housing at the rear of the transmission. This is also the outer member of a roller-type free-wheeling unit, having the rollers 39 and the cam 40. The cam 40 is splined to the shaft 37, as shown at 41. A ball bearing is shown at 42. A two-sided dog clutch is shown at 43, this having the teeth 44 which engage the teeth 45 of the free-wheeling unit and the teeth 46 of the no-back unit. A sleeve 47 turning free on the shaft 37 is surrounded with a clamp ring 48, the latter being fastened to a housing so that it can not turn. A low and reverse shifter rod 49 carries the two collars 50 and 51. Loose on the shifter rod is the control slider 52. A wire or rod 53 connects the control slider 52 with the manual free-wheeling lock-out control. This may be a lever, a dash control, or a separate foot control, as desired. A synchronizing clutch and spring are shown at 54 and 55. The clutch 54 is slidably connected to the sleeve 47 by means of the spring 55. It engages the dog clutch 43 which turns with the shaft 37, bringing the sleeve 47 up to speed before the teeth 44 and 46 engage.

In Figure VI is shown a sectional view of the control slider 52. This has a detent pin 56 and a spring 57. The pin engages the detents 58, 59 and 60. These detents are in a stationary member 61. When the control slider is opposite 58, the free-wheeling and no-back are both locked out. When it is opposite 59, free-wheeling is effective, but the no-back is not. Detent 59 may be omitted or made shallower than 58 and 60, if desired. When it is opposite 60, both free-wheeling and no-back are effective, the teeth 44 and 46 being engaged. The arm 62 connects the control slider 52 with a fork or yoke, engaging the groove 63.

Figure VII shows an end view of the clamp ring used in Figure V, the sleeve being shown at 47 and the clamp ring at 48. A lever arm 70 is connected to the clamp ring with the pins 64 and 65. The two pin holes in the clamp ring are separated by the slot 66. The lever arm 70 is connected to a housing 67 by means of the spring 68 and eye bolt 69. The spring 68 may be eliminated if desired.

In operation, the clamp ring is assembled on the sleeve with a slight initial tension. The sleeve 47 when locked to the shaft 37 by means of the sliding dog 43, turns with the shaft in the forward direction, or to the right as shown in Figure VII. When the shaft and sleeve tends to turn left, the clamp ring locks upon the sleeve and holds both from turning. When the dog clutch 43 is disengaged the shaft turns free inside the sleeve 47.

Figure VIII shows diagrammatically the control of the free-wheeling and no-back units with the shifter rod 49 shown in Figures V and VI. Two lines are drawn through the diagrams, one of them designating the position of the control slider for free-wheeling and no-back, and the other designating the neutral position of the two shifter rods. The diagrams are numbered 1 to 7 and the shifter rods are those of a conventional three-speed transmission.

In Diagram No. 1, the transmission is in low gear position, the free-wheeling and no-back slider being carried forward with the low and reverse shifter rod 49, so that the teeth of the dog clutch 43 engage those of the no-back sleeve, thus making the no-back operative. The free-wheeling is also operative as is seen from Figure V.

In Diagram No. 2, the low and reverse rod has been returned to the neutral position. The collar 50 comes up to the control slider but does not move it, the free-wheeling and no-back remaining operative. The second and high shifter rod, not being in any way connected to the control slider, does not affect it whether in high or second. Thus, in Diagrams Nos. 2 and 3, which represent the positions of high and second, both free-wheeling and no-back are effective.

In Diagram No. 4, the reverse position is shown. Here the collar 50 on the shifter rod 49 has moved the control slider 52 and dog clutch 43 to the left so that the teeth 44 and 45 engage, locking the outer part of the free-wheeling unit to the transmission shaft. The dog clutch being disengaged from the no-back sleeve 47, the shaft 37 turns free inside of it, making possible a backward motion of the shaft.

In Diagram No. 5, the low and reverse shifter rod has been returned to the neutral position. The collar 51 comes up to the control slider 52, but does not move it, the free-wheeling and no-back remaining locked out. Then, as shown in No. 7 diagram, a shift may be made to second and high, leaving the free-wheeling and no-back locked out. As soon, however, as a shift is made to low gear, as in Diagram No. 6, the free-wheeling and no-back again become operative. Whenever in second, high or neutral, the free-wheeling and no-back may be locked out with the free-wheeling lock-out control operating through the rod or wire 53.

The control slider 52 of Fig. V is shown in the free-wheeling position without the no-back. This position would be obtained by use of the manual control 53 or by a partial shift to low after having been in reverse. It would be desirable to have the control slider in this position if it were necessary to push the car backwards.

Referring to Figures IX and X, which is a modification, an end of a transmission shaft is shown at 71 and at the other end of the unit a taper 72 for connecting to a drive shaft. On the end of 71 is a spline 73 carrying the drum 74. The drum 75 fits against the end of 74 and the spring 76 extends the length of both drums. The drums are both splined on the outside as shown at 77 and 78. A circular sleeve 79 fits over the spline and has the groove 80 for carrying a control yoke or fork.

A no-back sleeve 81 having the spline 82 fits rotatably over the shaft 71. The clamp ring 83 fits over the sleeve 81. The clamp ring has the pins 84 and 85 and the three levers 86.

This combined unit, consisting of a coil-spring type of free-wheeling unit and a clamp-ring type of no-back unit, may be used with any of the control systems described. The single sliding sleeve 79 serves as a control member for both the free-wheeling and the no-back.

In Figure XI is shown a partial sectional view of an addition to the control slider of Figures I, II, III and IV. The control slider, when made up, with this addition, gives a slightly different operation. When shifting from reverse to neutral, the free-wheeling does not remain locked out, but the slider is carried to a neutral position corresponding to the middle detent, thus giving free-wheeling but not no-back. The no-back is engaged upon going into second gear.

A stationary rod is shown at 1 and a low and reverse shifter rod at 29; the latter having the collar 34 fast upon it. A slot 90 is cut into the rod 1 and has the cam surface 91 at one end of it. The pin 92 is held against the slot and cam by means of a spring 93 and washer 94. This washer is peened or otherwise secured at the end of the hole and the pin slides freely through it. The control slider and the shifter rod 29 are shown in a neutral position the same as in Figure IV.

The operation of the device is as follows.

When shifting to reverse, the rod 29 moves to the left, the collar 34 engaging the shoulder 9, carrying the control slider to the left until it is positioned by the detent 3. As the control slider moves to the left, the pin 92 is carried across the cam surface 91. This raises the pin so that it projects by the collar 34. Then, when shifting from reverse to neutral, the slider is carried back to the position shown, the pin having returned to the bottom of the slot 90, so that it no longer projects by the edge of the collar 34. The control slider stops in the middle detent, the collar 34 sliding by the end of the pin to the position shown, which is neutral. The control slider is now in a position that gives free-wheeling without no-back, the no-back being engaged upon shifting into second.

In Figure XII which is a modification is shown a plan view of a control slider similar in function to that of Figures I to IV.

Figure XIII is a partially sectioned end view of Figure XII.

Referring to Figures XII and XIII, a control slider body is shown at 100. This has the projection 101, similar to the projection 9 of Figure II. The end 102 serves as a stop for the lever arm 104, this lever having the hole 105 for attaching to a lock out control.

The dog 106 with the face 107 is part of the same casting or is solidly connected to the lever arm 104, both being pivoted about the pin 108. The spring 109 serves to normally keep the lever and the dog in the position shown. The pin 108 is held in place with a lock nut 110.

The stationary shaft 111 has the detents 112 and 113 and the projection 114 containing the detent plunger and spring. (See Figure I.) When the control slider is positioned by detent hole 112, both free-wheeling and no-back are effective; when positioned by detent hole 113 free-wheeling but not no-back is effective. When the control slider is to the left of detent hole 113 both free-wheeling and no-back are locked out. The spring 115 normally returns the control slider to the position of free-wheeling when shifting from reverse to or through neutral. However, the free-wheeling may be locked out or held locked out with the usual lock-out control.

The operation of the lock-out on the control slider is similar in principle to that of Figures I to IV. When the manual lock-out control is operated the slider will normally be positioned by detent hole 112 or 113. The detent spring should be sufficiently strong to hold the slider until the lever and dog are pulled to the left compressing the spring 109. The face 107 will then fall below the part which it normally engages so that further pulling of the no-back control will disengage the detent and pull the control slider to the left, thus locking out both free-wheeling and no-back.

In Figure XIV which is a modification a stationary rod is shown at 120. The control slider 121 has a projection with a hole 122 for connecting a manual lock-out control. A projection 123 on the opposite side engages the lug 124 which is held with pin 125 or other means to the low and reverse shifter rod 126. The spring 127 keeps the control slider in the position of free-wheeling and no-back at all times except when in reverse, unless it is locked out with the manual lock-out control. Part of the casing in which the stationary rod 120 is solidly held is shown at 128.

In Figs. XV and XVI, a universal joint housing is shown at 130, a no-back or no-back and free-wheeling housing at 131, transmission housing at 132, clutch housing at 133, and engine assembly at 134. The no-back and free-wheeling housing is partially cut away in Fig. XV to show the control mechanism of Figs. I to IV, assembled with the no-back and free-wheeling units shown in Fig. V. The same numerals designate the same parts in Fig. XV as in these figures.

A gear shift lever is shown at 135 and a connection for the drive shaft assembly at 136. The manual lock out connection 18 is connected to a lever 137, which pivots on the pin 138 which is secured in the housing 131. The lever 137 has a connection 139 to a push-pull control 140 which has the other end located at a convenient position for the operator.

The other end of lever 137 is inside the housing connected to the bottom end of pin 138 which carries the motion of the lever through the housing. The push-pull control has a housing 141 which is supported at 142.

In adapting any of these systems of control to transmissions, the question of relative motions must be kept in mind. That is, where one shifter rod serves two purposes for a given shift, the two parts to be shifted must be so designed that the same movement of the shifter rod will move both of them from their initial position to the final position.

Where the second and high shifter rod is used through a lever, these relative motions can be obtained by varying the length of the arms of the lever. In other cases it will be necessary to consider the depth of teeth in clutches used, the amount of lost motion, and possibly the spacing of the gears.

I claim:

1. In combination, a free-wheeling unit and a clamp ring type no-back unit, the two said units being locked into or out of use with a single sliding member, this member being controlled with the gear shift lever of a gear transmission.

2. Claim 1 and the said sliding member locking the said free-wheeling and no-back units into use when moved in one direction and out of use when moved in the opposite direction and an additional manual control for the said free-wheeling and no-back units.

3. In combination, a gear transmission, a free-wheeling unit and a clamp ring type no-back unit, a control for said combination whereby when said gear transmission is shifted into reverse, the said free-wheeling and no-back units will be rendered inoperative.

4. In a control system for a combination of a gear transmission, a free-wheeling unit and a no-back unit, two shifter rods, a stationary rod and a sliding member on said stationary rod, means on one of said shifter rods adapted to engage the said sliding member to move it in one direction and means on the other of said shifter rods adapted to move the said sliding member in the opposite direction, the said sliding member being adapted to control the free-wheeling and no-back units.

5. Claim 4 and separate manual control adapted to control the said free-wheeling and no-back units.

6. In a control system for a gear transmission, a free-wheeling unit and a no-back unit, two shifter rods, one of said rods controlling low and reverse, and the other of said rods controlling second and high, means attached to the first said rod to lock out the said free-wheeling and no-back units when the said rod is moved from the neutral position to the reverse position, means allowing the said shifter rod to be returned to the neutral position without rendering operative the two said units, and means adapted to render operative the two said units when the said rod is moved to the position of low gear.

7. In combination, a gear transmission, a free-wheeling unit and a no-back unit, two shifter rods means attached to one of the shifter rods of the said gear transmission for locking out the said free-wheeling and no-back units when the said gear transmission is shifted into reverse, and means for rendering the two said units operative again when the said transmission is shifted to or through neutral.

8. Claim 7 and an additional control for the said free-wheeling and no-back units.

9. In combination, a transmission having forward change speed means and a reverse means, a free wheeling means and a no-back means, the free-wheeling means having a driving part and a driven part and rollers acting between the two said parts, a clamp ring with a lever arm for the no-back means, and means adaptable to the control system of the transmission for rendering the said free-wheeling and no-back means inoperative when the reversing means of the transmission is made operative.

10. In combination a transmission having forward speed changing means and reversing means, a no-back means, the no-back means having a clamp ring with a lever arm, a sleeve between the said clamp ring and a shaft, means operably associated with the transmission for locking the said sleeve into rotative engagement with the said shaft or for permitting free turning of the shaft within the sleeve.

11. In combination a transmission having forward speed changing means and reversing means, a no-back means the no-back means having a clamp ring with a lever arm, control mechanism operably associated with the transmission for rendering the no-back means inoperative when the transmission is in reverse, means for maintaining the no-back means inoperative when shifting from reverse to neutral and means for rendering the no-back again operative when the transmission is shifted to low.

12. In combination a transmission having forward change speed means and a reverse means, a free-wheeling means and a no-back means, the free-wheeling means having a driving part and a driven part and a coil means acting between the two said parts, a clamp ring with a lever arm for the no-back means and means adapted to the control system of the transmission for rendering the said free-wheeling and no-back means inoperative when the reversing means of the transmission is made operative.

13. In combination a transmission having forward change speed means and reversing means, a free-wheeling means and a no-back means, mechanism operatively associated with the transmission for rendering the said free-wheeling and no-back means inoperative when the transmission is in reverse, a separate manual control for the no-back and free-wheeling means, the said manual control being adapted to maintain the free-wheeling means operative and the no-back means inoperative or to maintain both of the said units inoperative.

14. In combination a free-wheeling means and a no-back means, a driving member for the free-wheeling means and a driven member, means interposed between the two members to normally permit relative rotation between the members in one direction only, a lock out member for the free-wheeling means, the lock out member for the free-wheeling also serving to control the no-back, and a separate manual control for controlling the lock out member.

15. In combination a transmission having forward speed changing means and reversing means, a no-back means having a clamp ring with a lever arm, control mechanism operably associated with the transmission for rendering the no-back means inoperative when the transmission is in reverse, means for maintaining the no-back means inoperative when shifting from reverse to neutral and means for rendering the no-back again operative when the transmission is shifted to a forward speed.

16. In combination a transmission having forward and reverse speeds, a no-back means, the no-back means having a clamp ring with a lever arm, a sleeve on which the clamp ring acts, a shaft on which the said sleeve is rotatably mounted, means for connecting the said sleeve to the said shaft, the said means including means for bringing the shaft and the sleeve to the same relative speeds before engagement of the clutch teeth.

17. In combination a transmission having forward speed changing means and reversing means, no-back means having a clamp ring with a lever arm, the clamp ring and lever arm having a plurality of segments at their point of connection control mechanism operably associated with the transmission for rendering the no-back means inoperative when the transmission is in reverse, and a separate manual control for rendering or maintaining the no-back inoperative.

18. In combination a transmission having forward speed changing means and reversing means, a no-back means, the said no-back means having a clamp ring and a lever arm, the said clamp ring and lever arm having a plurality of segments at their place of connection, and pins connecting the segments of the clamp ring to those of the lever arm, and means operably associated with the transmission to render the no-back inoperative when the transmission is in reverse.

19. In a transmission, two shifter rods, one of said rods controlling low and reverse and the other of said rods controlling second and high gears, a free-wheeling unit and a no-back unit associated with the transmission, means attached to the first of said rods for rendering the free-wheeling and no-back units inoperative when the said rod is moved into the reverse position, and means adapted to this same said first rod for rendering the free-wheeling device operative when it is moved from the reverse to the neutral position, and means operated by the second said shifter rod for rendering the no-back unit operative when the rod is moved into the second gear position.

20. A control system for a gear transmission, a free-wheeling unit and a no-back unit, having two shifter rods, one of said rods being adapted to shift the low and reverse gears and the other of said rods being adapted to shift the second and high gears, means attached to the first said rod for rendering the free-wheeling and no-back units inoperative when the said rod is shifted to the reverse position, and means attached to the second of the said rods for rendering the two said units operative when the said rod is shifted into the position of second gear and means adapted to be attached to a separate manual control for rendering the free-wheeling and no-back units operative or inoperative.

21. In combination, a gear transmission, a free-wheeling unit and a no-back unit, shifter rods for the transmission, means operative by one of the said rods for locking out the free-wheeling and no-back units when the transmission is shifted into reverse, and means for rendering the free-wheeling unit operative again when the transmission is shifted to or through neutral and a separate manual control for the said free-wheeling and no-back units.

PHILLIP R. WHEELER.